(12) United States Patent
Richardson et al.

(10) Patent No.: US 9,030,045 B2
(45) Date of Patent: May 12, 2015

(54) SWITCHING SYSTEMS AND METHODS FOR USE IN UNINTERRUPTIBLE POWER SUPPLIES

(75) Inventors: James Patrick Richardson, Bellingham, WA (US); Than Quoc Le, Ferndale, WA (US)

(73) Assignee: Alpha Technologies Inc., Bellingham, WA (US)

( * ) Notice: Subject to any disclaimer, the term of this patent is extended or adjusted under 35 U.S.C. 154(b) by 584 days.

(21) Appl. No.: 13/352,308

(22) Filed: Jan. 17, 2012

(65) Prior Publication Data

US 2012/0217808 A1 Aug. 30, 2012

Related U.S. Application Data

(60) Provisional application No. 61/435,317, filed on Jan. 23, 2011.

(51) Int. Cl.
| | | |
|---|---|---|
| *H02J 9/00* | (2006.01) | |
| *H02J 9/06* | (2006.01) | |
| *H02M 1/10* | (2006.01) | |
| *H02M 1/00* | (2006.01) | |

(52) U.S. Cl.
CPC ............. *H02J 9/06* (2013.01); *H02J 2009/067* (2013.01); *H02M 1/10* (2013.01); *H02M 2001/0035* (2013.01); *Y02B 70/16* (2013.01)

(58) Field of Classification Search
USPC .......................................................... 307/64
See application file for complete search history.

(56) References Cited

U.S. PATENT DOCUMENTS

| | | | |
|---|---|---|---|
| 352,105 | A | 11/1886 | Zipernowsky et al. |
| 375,614 | A | 12/1887 | Eickemeyer |
| 414,266 | A | 11/1889 | Thomson |
| 1,718,238 | A | 6/1929 | Kettering et al. |

(Continued)

FOREIGN PATENT DOCUMENTS

| | | |
|---|---|---|
| CA | 2033685 | 10/1991 |
| CA | 2036296 | 11/1991 |

(Continued)

OTHER PUBLICATIONS

McGraw-Hill, Dictionary of Scientific and Technical Terms Fifth Edition, p. 745 and pp. 1696-1697, 1994.

(Continued)

*Primary Examiner* — Jared Fureman
*Assistant Examiner* — Dru Parries
(74) *Attorney, Agent, or Firm* — Michael R. Schacht; Schacht Law Office, Inc.

(57) ABSTRACT

The present invention may be embodied as an uninterruptible power supply comprising an input section, an output section, an inverter section, and a transformer. The transformer is operatively connected to the input section, the output section, and the inverter section. The uninterruptible power supply operates in a line mode and in a standby mode. In the standby mode, the output section generates an output power signal from a standby signal generated by the inverter section based on the alternative power source and at least one inverter control signal. When the uninterruptible power supply operates in the standby mode, the at least one inverter control signal is pulse-width modulated during at least a first portion of a cycle of the output power signal and not pulse-width modulated during at least a second portion of the cycle of the output power signal.

14 Claims, 3 Drawing Sheets

(56) References Cited

U.S. PATENT DOCUMENTS

| | | |
|---|---|---|
| 1,950,396 A | 3/1934 | Boucher |
| 2,007,415 A | 7/1935 | Walker |
| 2,014,101 A | 9/1935 | Bryan |
| 2,037,183 A | 4/1936 | Strieby |
| 2,036,994 A | 12/1936 | Frank et al. |
| 2,085,072 A | 6/1937 | Bobe |
| 2,165,969 A | 7/1939 | Humbert et al. |
| 2,240,123 A | 4/1941 | Shoup et al. |
| 2,302,192 A | 11/1942 | Dannheiser |
| 2,352,073 A | 6/1944 | Boucher et al. |
| 2,427,678 A | 9/1947 | Laging |
| 2,444,794 A | 7/1948 | Uttal et al. |
| 2,512,976 A | 6/1950 | Smeltzly |
| 2,688,704 A | 9/1954 | Christenson |
| 2,856,543 A | 10/1958 | Dixon et al. |
| 2,920,211 A | 1/1960 | Gotoh |
| 2,996,656 A | 8/1961 | Sola |
| 3,022,458 A | 2/1962 | Sola |
| 3,064,195 A | 11/1962 | Freen |
| 3,221,172 A | 11/1965 | Rolison |
| 3,283,165 A | 11/1966 | Bloch |
| 3,293,445 A | 12/1966 | Levy |
| 3,304,599 A | 2/1967 | Nordin |
| 3,305,762 A | 2/1967 | Geib, Jr. |
| 3,339,080 A | 8/1967 | Howald |
| 3,345,517 A | 10/1967 | Smith |
| 3,348,060 A | 10/1967 | Jamieson |
| 3,389,329 A | 6/1968 | Quirk et al. |
| 3,435,358 A | 3/1969 | Rheinfelder |
| 3,458,710 A | 7/1969 | Dodge |
| 3,521,152 A | 7/1970 | Emerson |
| 3,525,035 A | 8/1970 | Kakalec |
| 3,525,078 A | 8/1970 | Baggott |
| 3,546,571 A | 12/1970 | Fletcher et al. |
| 3,590,362 A | 6/1971 | Kakalec |
| 3,636,368 A | 1/1972 | Sia |
| 3,678,284 A | 7/1972 | Peters |
| 3,678,377 A | 7/1972 | Chiffert |
| 3,686,561 A | 8/1972 | Spreadbury |
| 3,691,393 A | 9/1972 | Papachristou |
| 3,742,251 A | 6/1973 | Thompson et al. |
| 3,823,358 A | 7/1974 | Rey |
| 3,859,589 A | 1/1975 | Rush |
| 3,860,748 A | 1/1975 | Everhart et al. |
| 3,873,846 A | 3/1975 | Morio et al. |
| 3,909,560 A | 9/1975 | Martin et al. |
| 3,916,295 A | 10/1975 | Hunter |
| 3,938,033 A | 2/1976 | Borkovitz et al. |
| 3,943,447 A | 3/1976 | Shomo, III |
| 4,004,110 A | 1/1977 | Whyte |
| 4,010,381 A | 3/1977 | Fickenscher et al. |
| 4,122,382 A | 10/1978 | Bernstein |
| 4,130,790 A | 12/1978 | Heisey |
| 4,170,761 A | 10/1979 | Koppehele |
| 4,217,533 A | 8/1980 | Van Beek |
| 4,251,736 A | 2/1981 | Coleman |
| 4,262,245 A | 4/1981 | Wendt |
| 4,270,080 A | 5/1981 | Kostecki |
| 4,277,692 A | 7/1981 | Small |
| 4,313,060 A | 1/1982 | Fickenscher et al. |
| 4,353,014 A | 10/1982 | Willis |
| 4,366,389 A | 12/1982 | Hussey |
| 4,366,390 A | 12/1982 | Rathmann |
| 4,385,263 A | 5/1983 | Luz et al. |
| 4,400,624 A | 8/1983 | Ebert, Jr. |
| 4,400,625 A | 8/1983 | Hussey |
| 4,423,379 A | 12/1983 | Jacobs et al. |
| 4,460,834 A | 7/1984 | Gottfried |
| 4,466,041 A | 8/1984 | Witulski et al. |
| 4,472,641 A | 9/1984 | Dickey et al. |
| 4,475,047 A | 10/1984 | Ebert |
| 4,510,401 A | 4/1985 | Legoult |
| 4,604,530 A | 8/1986 | Shibuya |
| 4,616,305 A | 10/1986 | Damiano et al. |
| 4,631,471 A | 12/1986 | Fouad et al. |
| 4,656,412 A | 4/1987 | McLyman |
| 4,670,702 A | 6/1987 | Yamada et al. |
| 4,673,825 A | 6/1987 | Raddi et al. |
| 4,686,375 A | 8/1987 | Gottfried |
| 4,697,134 A | 9/1987 | Burkum et al. |
| 4,700,122 A | 10/1987 | Cimino et al. |
| 4,709,318 A | 11/1987 | Gephart et al. |
| 4,719,427 A | 1/1988 | Morishita et al. |
| 4,719,550 A | 1/1988 | Powell et al. |
| 4,724,290 A | 2/1988 | Campbell |
| 4,724,478 A | 2/1988 | Masuko et al. |
| 4,740,739 A | 4/1988 | Quammen et al. |
| 4,745,299 A | 5/1988 | Eng et al. |
| 4,748,341 A | 5/1988 | Gupta |
| 4,748,342 A | 5/1988 | Dijkmans |
| 4,763,014 A | 8/1988 | Model et al. |
| 4,775,800 A | 10/1988 | Wood |
| 4,791,542 A | 12/1988 | Piaskowski |
| 4,829,225 A | 5/1989 | Podrazhansky et al. |
| 4,860,185 A | 8/1989 | Brewer et al. |
| 4,882,717 A | 11/1989 | Hayakawa et al. |
| 4,890,213 A | 12/1989 | Seki |
| 4,916,329 A | 4/1990 | Dang et al. |
| 4,920,475 A | 4/1990 | Rippel |
| 4,926,084 A | 5/1990 | Furutsu et al. |
| 4,943,763 A | 7/1990 | Bobry |
| 4,952,834 A | 8/1990 | Okada |
| 4,954,741 A | 9/1990 | Furutsu et al. |
| 4,975,649 A | 12/1990 | Bobry |
| 4,988,283 A | 1/1991 | Nagasawa et al. |
| 5,010,469 A | 4/1991 | Bobry |
| 5,017,800 A | 5/1991 | Divan |
| 5,029,285 A | 7/1991 | Bobry |
| 5,057,698 A | 10/1991 | Widener et al. |
| 5,137,020 A | 8/1992 | Wayne et al. |
| 5,148,043 A | 9/1992 | Hirata et al. |
| 5,154,986 A | 10/1992 | Takechi et al. |
| 5,168,205 A | 12/1992 | Kan et al. |
| 5,172,009 A | 12/1992 | Mohan |
| 5,185,536 A | 2/1993 | Johnson, Jr. et al. |
| 5,193,067 A | 3/1993 | Sato et al. |
| 5,198,698 A | 3/1993 | Paul et al. |
| 5,198,970 A | 3/1993 | Kawabata et al. |
| 5,200,643 A | 4/1993 | Brown |
| 5,229,650 A | 7/1993 | Kita et al. |
| 5,237,208 A | 8/1993 | Tominaga et al. |
| 5,281,919 A | 1/1994 | Palanisamy |
| 5,302,858 A | 4/1994 | Folts |
| 5,400,005 A | 3/1995 | Bobry |
| 5,410,720 A | 4/1995 | Osterman |
| 5,440,179 A | 8/1995 | Severinsky |
| 5,457,377 A | 10/1995 | Jonsson |
| 5,483,463 A | 1/1996 | Qin et al. |
| 5,532,525 A | 7/1996 | Kaiser et al. |
| 5,579,197 A | 11/1996 | Mengelt et al. |
| 5,602,462 A | 2/1997 | Stich et al. |
| 5,610,451 A | 3/1997 | Symonds |
| 5,635,773 A | 6/1997 | Stuart |
| 5,638,244 A | 6/1997 | Mekanik et al. |
| 5,642,002 A | 6/1997 | Mekanik et al. |
| 5,739,595 A | 4/1998 | Mekanik et al. |
| 5,745,356 A | 4/1998 | Tassitino, Jr. et al. |
| 5,747,887 A | 5/1998 | Takanaga et al. |
| 5,747,888 A | 5/1998 | Zilberberg |
| 5,760,495 A | 6/1998 | Mekanik |
| 5,768,117 A | 6/1998 | Takahashi et al. |
| 5,783,932 A | 7/1998 | Namba et al. |
| 5,790,391 A | 8/1998 | Stich et al. |
| 5,844,327 A | 12/1998 | Batson |
| 5,880,536 A | 3/1999 | Mardirossian |
| 5,892,431 A | 4/1999 | Osterman |
| 5,897,766 A | 4/1999 | Kawatsu |
| 5,901,057 A | 5/1999 | Brand et al. |
| 5,925,476 A | 7/1999 | Kawatsu |
| 5,961,604 A | 10/1999 | Anderson et al. |
| 5,982,645 A | 11/1999 | Levran et al. |
| 5,982,652 A | 11/1999 | Simonelli et al. |
| 5,994,793 A | 11/1999 | Bobry |
| 5,994,794 A | 11/1999 | Wehrlen |

(56) References Cited

U.S. PATENT DOCUMENTS

| | | | |
|---|---|---|---|
| 6,011,324 | A | 1/2000 | Kohlstruck et al. |
| 6,014,015 | A | 1/2000 | Thorne et al. |
| 6,028,414 | A | 2/2000 | Chouinard et al. |
| 6,069,412 | A | 5/2000 | Raddi et al. |
| 6,100,665 | A | 8/2000 | Alderman |
| 6,198,178 | B1 | 3/2001 | Schienbein et al. |
| 6,212,081 | B1 | 4/2001 | Sakai |
| 6,218,744 | B1 | 4/2001 | Zahrte, Sr. et al. |
| 6,288,456 | B1 | 9/2001 | Cratty |
| 6,288,916 | B1 | 9/2001 | Liu et al. |
| 6,295,215 | B1 | 9/2001 | Faria et al. |
| 6,348,782 | B1 | 2/2002 | Oughton, Jr. et al. |
| 6,465,910 | B2 | 10/2002 | Young et al. |
| 6,486,399 | B1 | 11/2002 | Armstrong et al. |
| 6,602,627 | B2 | 8/2003 | Liu et al. |
| 6,841,971 | B1 | 1/2005 | Spee et al. |
| 6,906,933 | B2 | 6/2005 | Taimela |
| 6,933,626 | B2 | 8/2005 | Oughton, Jr. |
| 7,040,920 | B2 | 5/2006 | Johnson, Jr. et al. |
| 7,182,632 | B1 | 2/2007 | Johnson, Jr. et al. |
| 7,449,798 | B2 | 11/2008 | Suzuki et al. |
| 2005/0258927 | A1 | 11/2005 | Lu |
| 2009/0196082 | A1 | 8/2009 | Mazumder et al. |
| 2012/0091811 | A1 | 4/2012 | Heidenreich et al. |
| 2012/0212051 | A1 | 8/2012 | Heidenreich et al. |
| 2012/0217800 | A1 | 8/2012 | Heidenreich et al. |
| 2012/0217806 | A1 | 8/2012 | Heidenreich et al. |
| 2012/0217808 | A1 | 8/2012 | Richardson et al. |

FOREIGN PATENT DOCUMENTS

| | | |
|---|---|---|
| CA | 1297546 | 3/1992 |
| CA | 2086897 | 7/1993 |
| CA | 2028269 | 1/2000 |
| CA | 2403888 | 9/2002 |
| CA | 2713017 | 7/2009 |
| DE | 2602789 | 7/1977 |
| DE | 2809514 | 9/1978 |
| DE | 3321649 | 12/1983 |
| EP | 0284541 | 9/1988 |
| FR | 762789 | 4/1934 |
| FR | 861215 | 2/1941 |
| GB | 005201 | 4/1885 |
| GB | 260731 | 9/1925 |
| GB | 2005118 | 4/1979 |
| GB | 2120474 | 11/1983 |
| GB | 2137033 | 3/1984 |
| GB | 2171861 | 9/1986 |
| GB | 2185326 | 10/1986 |
| GB | 2355350 | 4/2001 |
| JP | 5482053 | 6/1979 |
| JP | 55032133 | 3/1980 |
| JP | 5650417 | 5/1981 |
| JP | 56155420 | 12/1981 |
| JP | 2000350381 | 12/2000 |
| JP | 2001190035 | 7/2001 |
| JP | 2005295776 | 10/2005 |
| JP | 2010136547 | 6/2010 |
| RU | 2221320 | 10/2004 |
| WO | 8501842 | 4/1985 |

OTHER PUBLICATIONS

H.C. Gerdes et al., A Practical Approach to Understanding Ferroresonance, EEE—Circuit Design Engineering, pp. 87-89, Apr. 1966.

Harry P. Hart et al., The Derivation and Application of Design Equations for Ferroresonant Voltage Regulators and Regulated Rectifiers, IEEE Transactions on Magnetics, vol. MAG-7, No. 1, Mar. 1971, pp. 205-211.

Robert J. Kakalec et al., New Technology for Battery-Charging Rectifiers, Bell Laboratories Record, May 1979, pp. 131-134.

Jefferson T. Mitchell et al., Rectifiers and Energy Conservation, Telecommunications, Mar. 1979, 3 pages.

Rex Teets, Application and Design of Ferroresonant Transformers, No Date, pp. 28-34.

IEEE Standard for Ferroresonant Voltage Regulators, Electronics Transformer Technical Committee of the IEEE Power Electronics Society, IEEE Std. 449-1990, May 16, 1990, 29 pages.

Stewart Nowak, Power Problems: Selecting a UPS, Electronics Test, Jul. 13, 1990, 4 pages, No. 7, San Francisco, CA, US.

International Search Report, PCT/US99/19677, Feb. 8, 2000, 5 pages.

Xia, Ordinary Meter Measures Battery Resistance, EDN—Design Ideas, Jun. 24, 1993, 2 pages.

Bridge et al., "Preventing outages without batteries", CED, Jun. 1999, 7 pages.

Broadband Business and News Perspective, "Cable operators feeling power surge", Reprinted from CED, Apr. 2000, 4 pages.

Ivensys, "Power When You Really Need It!", Publication No. CSG29FXA, Feb. 2000, 2 pages.

Ivensys, "Sometimes Less Is More!", Publication No. CSG28FXA, Feb. 2000, 2 pages.

Lectro Products Incorporated, "Solving CATV Power Solutions", Publication No. CSG24FYA, Jun. 1999, 12 pages.

Lectro Products Incorporated, "Lectro Ferro Family", Publication No. CSG16FXA, Nov. 1998, 4 pages.

Marcotte, "Power migration strategies for future-proofing", Reprinted from CED Magazine, Jun. 1997, 4 pages.

Marcotte et al., "Powering Cable TV Systems", Reprinted from Broadband Systems & Design, Jun. 1996, 4 pages.

Multipower, Inc., "Confluence Newsletters, vols. I and II", "MP 900", and "MP1350", web site http://www.multipowerups.com/index.htm, Aug. 2000, 16 pages.

International Searching Authority, "PCT/US2011/025000", International Search Report, Oct. 26, 2011, 9 pages.

International Searching Authority, "PCT/US2012/021619", International Search Report, May 17, 2012, 7 pages.

Spears, "Disturbances Can Toast Your System", Reprint from Communications Technology, Apr. 2000, 4 pages.

Kakalec, "A Feedback-Controlled Ferroresonant Voltage Regulator," IEEE Transactions of Magnetics, Mar. 1970, 5 pages, vol. Mag-6, No. 1.

SWITCHING SYSTEMS AND METHODS FOR USE IN UNINTERRUPTIBLE POWER SUPPLIES

RELATED APPLICATIONS

This application, U.S. patent application Ser. No. 13/352,308 filed Jan. 17, 2012, claims benefit of U.S. Provisional Patent Application Ser. No. 61/435,317 filed Jan. 23, 2011.

The contents of the related application(s) listed above are incorporated herein by reference.

TECHNICAL FIELD

The present invention relates the generation of a standby power signal and, more specifically, to uninterruptible power supply systems and methods that generate a standby signal using an inverter system.

BACKGROUND

Uninterruptible power supplies (UPS's) have long been used to provide at least temporary auxiliary power to electronic devices. Typically, a UPS is configured to switch between a primary power source and a standby power source as necessary to maintain constant power to a load. Typically, the primary power source for a UPS is a utility power supply, and the standby power source may take the form of a battery system. The UPS will normally operate in a line mode in which the utility power signal is passed to the load when the utility power signal is within predefined parameters. In the line mode, the UPS will typically also charge the battery system. When the utility power falls outside of the predefined parameters, the UPS will switch to standby mode in which an AC signal is generated based on the energy stored in the battery system.

A class of UPS's employs a ferroresonant transformer. A ferroresonant transformer is a saturating transformer that employs a tank circuit comprised of a resonant winding and capacitor to produce a nearly constant average output even if the input to the transformer varies. A typical UPS employing a ferroresonant transformer takes advantage of the voltage regulating properties of a ferroresonant transformer in both line and standby modes. In the context of a UPS, a ferroresonant transformer thus provides surge suppression, isolation, short circuit protection, and voltage regulation without the use of active components.

Conventionally, in line mode, a UPS employs an inverter circuit configured to form a switch mode power supply. An inverter circuit configured as a switch mode power supply typically comprises at least one and typically a plurality of power switches that are operated according to a pulse-width modulated (PWM) signal. The PWM method of generating an AC signal from a DC source allows the amplitude of the AC signal to be determined at any point in time by controlling the duty cycle at which the inverter power switches are operated. Controlling the duty cycle at which the inverter power switches are operated produces, through an output LC filter, a desired net average voltage. Typically, the parameters of the inverter control signal are varied according to a control signal generated by a feedback loop having an input formed by at least one characteristic, such as voltage, of the AC signal.

In a switch mode power supply, one of the major causes of loss of efficiency arises from the imperfect switching characteristics of modern power switches during the transition between the ON and OFF configurations of the power switches. An object of the present invention is to provide switch mode power supplies for use in UPS systems having improved efficiency.

SUMMARY

The present invention may be embodied as an uninterruptible power supply for providing an output power signal to a load based on an input power signal comprising an input section, an output section, an inverter section, and a transformer. The input section is operatively connected to the input power signal. The output section is operatively connected to the load. The inverter section is operatively connected to an alternative power source. The transformer is operatively connected to the input section, the output section, and the inverter section. The uninterruptible power supply operates in a line mode and in a standby mode. In the line mode, the output section generates the output power signal based on the input power signal. In the standby mode, the output section generates the output power signal from a standby signal generated by the inverter section based on the alternative power source and at least one inverter control signal. When the uninterruptible power supply operates in the standby mode, the at least one inverter control signal is pulse-width modulated during at least a first portion of a cycle of the output power signal and not pulse-width modulated during at least a second portion of the cycle of the output power signal.

The present invention may also be implemented as a method of providing an output power signal to a load based on an input power signal comprising the following steps. An input section is connected to the input power signal. An output section is connected to the load. An inverter section is connected to an alternative power source. A transformer is connected to the input section, the output section, and the inverter section. The uninterruptible power supply is operated in a line mode and a standby mode. In the line mode, the output generates the output power signal based on the input power signal. In the standby mode, the output section generates the output power signal based on a standby signal generated by the inverter section from the alternative power source and at least one inverter control signal. When the uninterruptible power supply operates in the standby mode, the at least one inverter control signal is generated such that the at least one inverter control signal is pulse-width modulated during at least a first portion of a cycle of the output power signal and not pulse-width modulated during at least a second portion of the cycle of the output power signal.

The present invention may also be embodied as an uninterruptible power supply for providing an output power signal to a load based on an input power signal comprising an input section, an output section, an inverter section, and a transformer. The input section is operatively connected to the input power signal. The output section is operatively connected to the load. The inverter section is operatively connected to an alternative power source. The transformer is operatively connected to the input section, the output section, and the inverter section. The uninterruptible power supply operates in a line mode and in a standby mode. In the line mode, the output section generates the output power signal based on the input power signal. In the standby mode, the output section generates the output power signal from a standby signal generated by the inverter section based on the alternative power source and first and second inverter control signals. When the uninterruptible power supply operates in the standby mode, the first inverter control signal is switched between OFF and ON states during a first portion of the cycle of the output power signal, held in the ON state during a second portion of the cycle of the output power signal, switched between OFF and ON states during a third portion of the cycle of the output power signal. When the uninterruptible power supply operates in the standby mode, the second inverter control signal is switched between OFF and ON states during a fourth portion of the cycle of the output power signal, held in the ON state during a fifth portion of the cycle of the output power signal, and switched between OFF and ON states during a sixth portion of the cycle of the output power signal.

DETAILED DESCRIPTION

Figure 1:
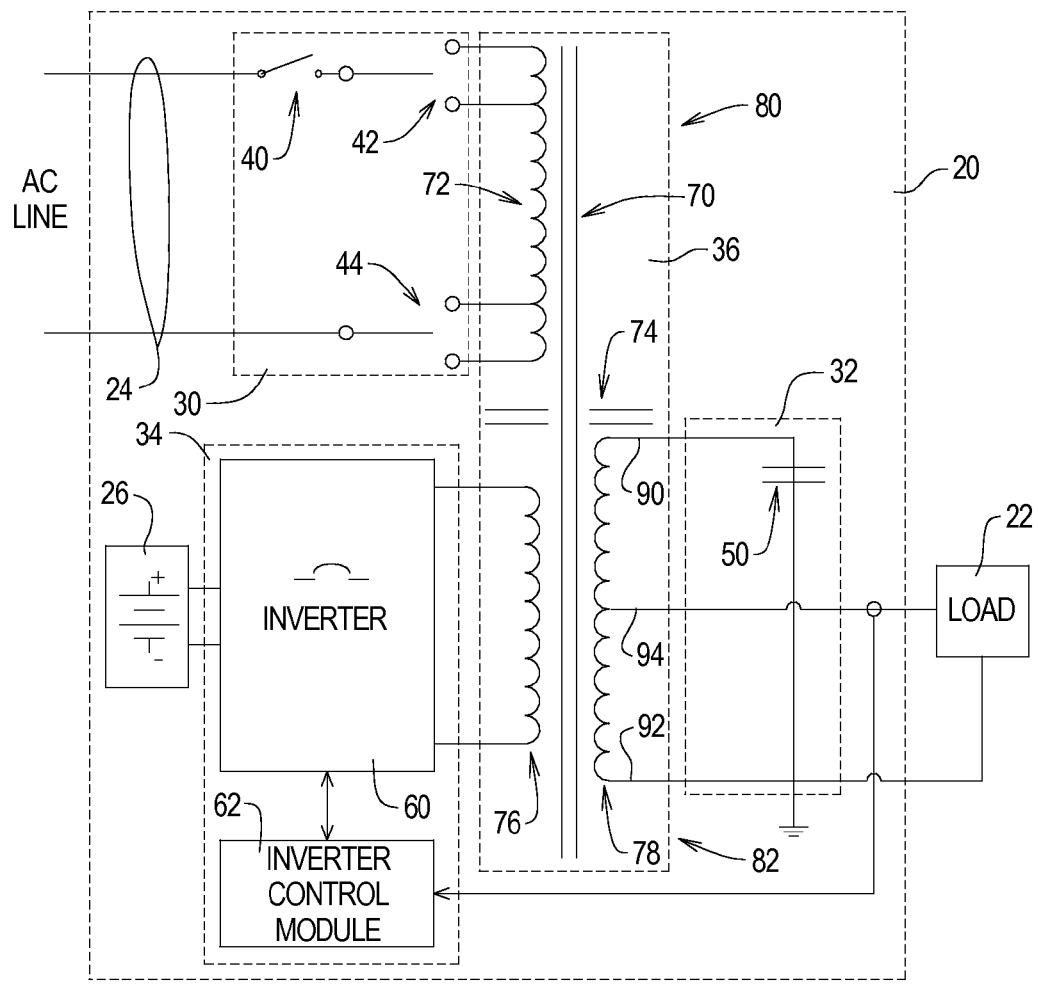
FIG. 1 is a simplified block diagram of a first embodiment of an uninterruptible power supply system using a ferroresonant transformer system constructed in accordance with, and embodying, the principles of the present invention.

Referring initially to FIG. 1 of the drawing, depicted therein is a first example of an uninterruptible power supply (UPS) system 20 constructed in accordance with, and embodying, the principles of the present invention. The present invention is of particular significance when applied to a UPS system adapted for use in a communications system, such as CATV or telephony system, and that use of the present invention will be disclosed herein in detail. However, it should be understood that the principles of the present invention may be applied to UPS systems adapted for use in environments other than communications systems.

The example UPS system 20 supplies power to a load 22 based on a primary power signal present on an AC power line 24 (line mode) or a secondary power signal generated by a battery pack 26 (standby mode). While the example secondary power signal is generated by a battery pack in the example UPS system 20, alternative power sources such as generators, fuel cells, solar cells, and the like may be used as the secondary power source.

The example UPS system 20 comprises an input section 30, an output section 32, an inverter section 34, and a ferroresonant transformer 36. The example input section 30 comprises a main switch 40 and first and second select switches 42 and 44. The example output section 32 comprises an output (e.g., resonant) capacitor 50. The output capacitor 50 forms a resonant or tank circuit with the transformer 36 as will be described in further detail below.

The inverter section 34 comprises an inverter circuit 60 and a controller 62. The inverter circuit 60 may be an H-bridge circuit or any other circuit capable of producing an appropriate AC power signal based on a DC power signal obtained from the battery pack 26. The inverter circuit 60 is or may be conventional and will not be described herein in further detail.

The example controller 62 controls the inverter circuit 60. The controller 62 may further control the charging of the battery pack 26 when the UPS system 20 operates in line mode based on temperature, voltage, and/or current signals associated with the battery pack 26.

The example inverter circuit 60 is pulse-width modulated, and the inverter section 34 functions as a switch mode power supply when the UPS system 20 operates in the standby mode. As will be described in further detail below, the controller 62 generates one or more inverter control signals that control the inverter circuit to generate a switched output signal.

The example ferroresonant transformer 36 comprises a core 70, input windings 72, an inductor 74, inverter windings 76, and output windings 78. The core 70 is or may be a conventional laminate structure. The inductor 74 defines a primary side 80 and a secondary side 82 of the transformer 36. In the example UPS system 20, the output capacitor 50 is connected across first and second ends 90 and 92 of the output windings 78, and the load is connected between the second end 92 of the output windings 78 and a tap 94 in the output windings 78.

In the example transformer 36, only the input windings 72 are on the primary side 80 of the transformer 36. The inverter windings 76 and output windings 78 are on the secondary side 82 of the transformer 36. In particular, the output windings 78 are arranged between the inverter windings 76 and the inductor 74, and the inductor 74 is arranged between the output windings 78 and the input windings 72. A ferroresonant transformer appropriate for use as the example ferroresonant transformer 36 is described, for example, in copending U.S. Patent Application Ser. Nos. 60/305,926 and 12/803,787, and those applications are incorporated herein by references. The principles of the present invention may, however, be applied to other configurations of ferroresonant transformers.

In line mode, the main switch 40 is closed and the AC power line 24 is present on the input windings 72. The input windings 72 are electromagnetically coupled to the output windings 78 such that a primary AC output signal is supplied to the load 22 when the UPS system 20 operates in the line mode.

In standby mode, the main switch 40 is opened, and the battery pack 26 and inverter section 34 form a secondary power source supplies a standby AC output signal to the load 22. In particular, in standby mode the inverter section 34 generates the switched power signal across the inverter windings 76, and the inverter windings 76 are electromagnetically coupled to the output windings 78 and to the output capacitor such that the standby AC output signal is present across the tap 94 and the second end 92 of the output windings 78. Further, during standby mode, an optional switch (not shown) may be provided in series with the output capacitor 50 to allow the output capacitor 50 to be disconnected from the output windings, thereby reducing peak inverter currents observed due to charging and discharging of the output capacitor 50.

The example inverter section 34 conventionally comprises at a plurality of power switches (not shown) configured as a switch mode power supply. Typically, the power switches are MOSFETS configured as an H-bridge circuit or any other circuit capable of producing an appropriate standby AC power signal based on a DC power signal obtained from the battery pack 26.

The inverter control module 62 generates one or more inverter control signals based on a characteristic, such as voltage, of the standby AC output signal applied to the load 22. The inverter control signal or signals may be pulse-width modulated (PWM) signals the characteristics of which cause the power switches of the inverter circuit 60 to open and close as necessary to generate the standby AC output signal within predetermined voltage, frequency, and waveform parameters. In the example UPS system 20 operating in standby mode, the inverter circuit 60, inverter control circuit 62, the inverter windings 76, and output windings 78 thus form a feedback loop that controls a desired net average voltage as appropriate for the load 22.

The Applicants have recognized that loads, such as the example load 22 to which power is supplied by a UPS used in communications networks such as CATV networks, are constant power loads that typically employ a diode rectifier circuit supplying a large capacitor bank. Such loads demand very high current at the peak AC power voltage at the instant the AC voltage amplitude exceeds the bus capacitor voltage. The Applicants further recognized that a substantial portion, if not all, of the load power will be delivered in the period during which the AC voltage amplitude is higher than the DC bus capacitor. This results in higher peak current to compensate for the fact that less than 100% of the time is available to transfer energy to the load.

The inverter control module 62 of the present invention thus eliminates the pulse-width modulation at the peak of the standby AC output signal. The Applicant has discovered that the elimination of pulse-width modulation at the peak of the standby AC output signal allows the power switches of the inverter circuit 60 to be full ON (100% duty cycle) during the time of peak current transfer to the bus capacitors. Eliminating pulse-width modulation of the inverter control signal during at least part of the cycle of the standby AC output signal significantly improves (by between approximately 10-20%) the efficiency of the UPS system 20 when operating in standby mode.

Figure 2:
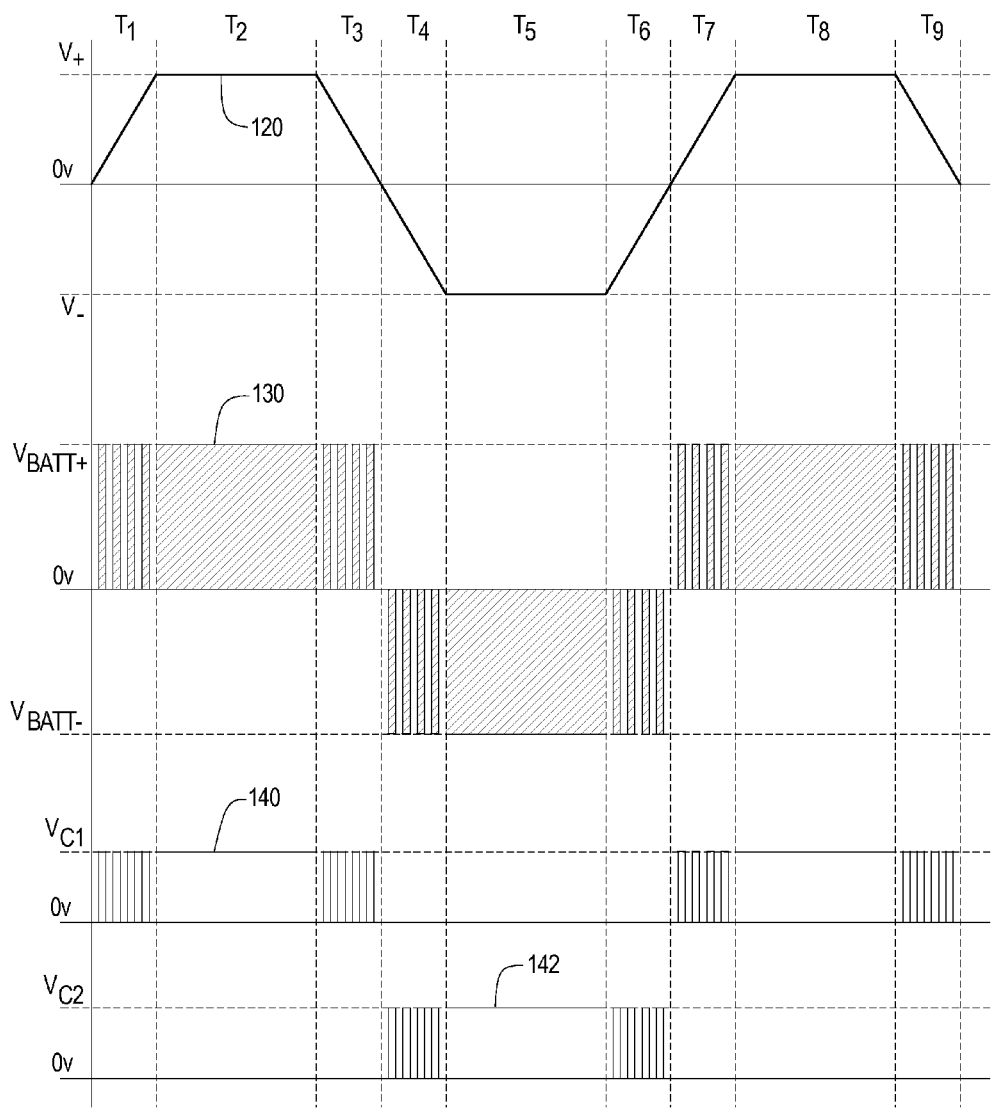
FIG. 2 is a timing diagram representing control and power signals employed by the UPS system depicted in FIG. 1.

Referring now to FIG. 2 of the drawing, depicted therein are several waveforms that may be implemented by the example UPS system 20 operating in standby mode. FIG. 2 conventionally plots each voltage (y-axis) versus time (x-axis). FIG. 2 is further divided into first through ninth time periods $T_{1-9}$ separated by vertical broken lines.

Depicted at 120 is an example standby AC output signal 120 supplied to the load 22. Depicted at 130 in FIG. 2 is an example switched power signal 130 generated by the inverter section 34 and applied across the inverter windings 76. Depicted at 140 and 142 in FIG. 2 are representations of inverter control signals that may be generated by the inverter control module 62 for controlling the inverter power switches of the inverter circuit 60. As is conventional, the first inverter control signal using the principles of the present invention, the inverter control signals 140 and 142 may operate at a relatively high frequency, e.g., approximate 20 kHz, with a duty cycle that is to varied between 0% and 100% as described below to obtain the desired waveform.

The period of peak current transfer occurs in the time periods $T_2$, $T_5$, and $T_8$ in FIG. 2. During these periods, the inverter control signal generated by the inverter control module 62 for controlling the inverter circuit 60 is held in a state that closes the power switches (100% duty cycle) of the inverter circuit 60. FIG. 2 further shows that the switched power signal 130 generated by the example inverter section 34 is pulse-width modulated (switched between OFF and ON) during the time periods $T_1$, $T_3$, $T_4$, $T_6$, $T_7$ and $T_9$ outside of the periods of peak current transfer and is held HIGH (100% duty cycle) during the time periods $T_2$, $T_5$, and $T_8$. The operation of these switches of the inverter circuit 60 in their least efficient mode (from ON to OFF or from OFF to ON) is thus avoided during the period of peak current transfer to the load 22. The inverter control signals 140 and 142 represent one example method of controlling an inverter circuit such as the example inverter circuit 60 to generate the switched power signal 130 and standby AC output signal 120 as depicted in FIG. 2

The example standby AC output signal 120 depicted in FIG. 2 is what is referred to as a modified or quasi square wave. A standby AC power signal having a modified or quasi square wave, such as the example signal 120, is appropriate for providing power to the load 22.

Figure 3:
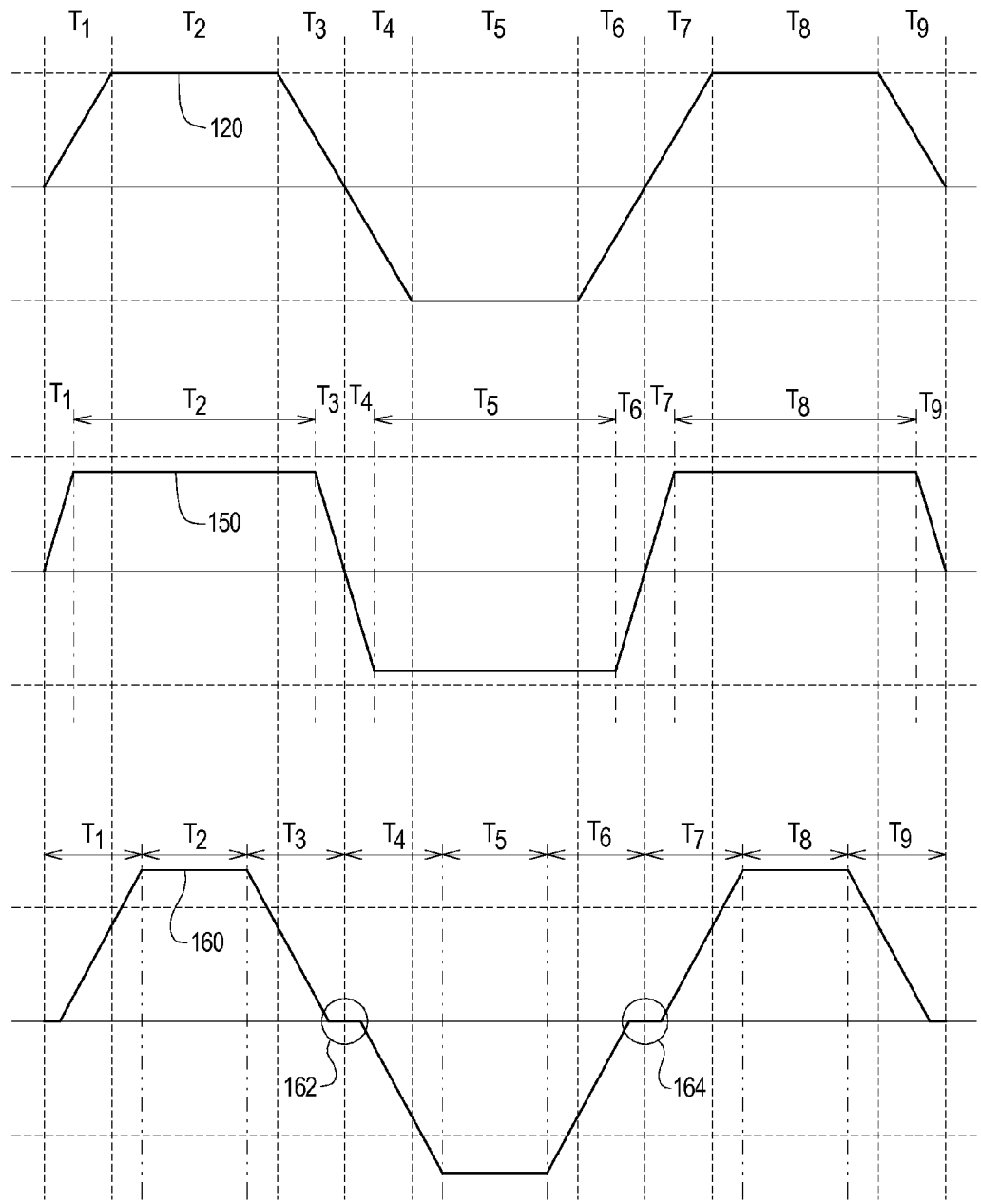
FIG. 3 depicts a first quasi-square wave form, a second quasi-square wave form, and a third quasi-square waveform.

To provide voltage regulation, the duration of the periods of time $T_2$, $T_5$, and $T_8$ in which the switches are operated at 100% duty cycle (held ON) can be varied as shown in FIG. 3. FIG. 3 illustrates second and third example standby AC power signals 150 and 160; the example standby AC power signal 120 is also reproduced in FIG. 3 for reference. The second example standby AC power signal 150 corresponds to a load having a low DC bus relative to the mid DC bus of the load corresponding to the first example standby AC output signal 120. The third example standby AC power signal 160 corresponds to a load having a high DC bus relative to the mid DC bus of the load corresponding to the first example standby AC output signal 120.

Additionally, to provide voltage regulation and maintain an acceptable modified or quasi square wave, the inverter control signals 140 and 142 are generated to alter the dV/dt, or slope, of the standby AC power signal 120 during the time periods $T_1$, $T_3$, $T_4$, $T_6$, $T_7$ and $T_9$ outside of the periods of peak current transfer. Additionally, the switched power signal 130 may be held at zero during phase change transitions to allow more control of voltage regulation.

The second example standby AC power signal 150 thus has a lower peak voltage during peak current transfer in the time periods $T_2$, $T_5$, and $T_8$ and steeper slope during the time periods $T_1$, $T_3$, $T_4$, $T_6$, $T_7$ and $T_9$ outside of the periods of peak current transfer. The steeper slope in the time periods $T_1$, $T_3$, $T_4$, $T_6$, $T_7$ and $T_9$ is obtained by appropriate control of the duty cycle of the switched power signal 130.

The third example standby AC power signal 160, on the other hand, has a higher peak voltage during peak current transfer in the time periods $T_2$, $T_5$, and $T_8$. The slope of the third example standby AC power signal is similar to the slope of the first example AC power signal 160 during the time periods $T_1$, $T_3$, $T_4$, $T_6$, $T_7$ and $T_9$ outside of the periods of peak current transfer. However, the third example standby AC power signal 160 is held at zero for a short time during crossover periods 162 and 164 when the AC power signal 160 changes phase. The zero voltage at the crossover periods 162 and 164 is obtained by turning the switched power signal 130 OFF (0% duty cycle) during the crossover periods 162 and 164.

More generally, the switching pattern of the inverter control signals and the design of the transformer are optimized to provide maximum efficiency across the specified output voltage and specified load range. Relevant optimization schemes include providing enough volt-seconds to the inverter winding to meet the voltage requirements of the load but not so many volt-seconds that the transformer saturates.

Given the foregoing, it should be apparent that the principles of the present invention may be embodied in forms other than those described above. The scope of the present invention should thus be determined by the claims to be appended hereto and not the foregoing detailed description of the invention.

What is claimed is:

1. An uninterruptible power supply for providing an output power signal to a load based on an input power signal comprising:
   an input section operatively connected to the input power signal;
   an output section operatively connected to the load;
   an inverter section operatively connected to an alternative power source; and
   a transformer operatively connected to the input section, the output section, and the inverter section; wherein
   the uninterruptible power supply operates in
   a line mode in which the output section generates the output power signal based on the input power signal, and a standby mode in which the output section generates the output power signal from a standby signal generated by the inverter section based on the alternative power source and at least one inverter control signal;

the output power signal is a quasi square wave having a first change of phase, an upper limit, and a second change of phase;

a cycle of the output power signal comprises a first portion, a second portion, and a third portion, in which
the first portion extends from the first change of phase to the upper limit,
the third portion extends from the upper limit to the second change of phase, and
the second portion extends between the first portion and the third portion; and when the uninterruptible power supply operates in the standby mode, the at least one inverter control signal is
pulse-width modulated during the first portion of a cycle of the output power signal,
held in an ON state during the second portion of the cycle of the output power signal, and
pulse-width modulated during the third portion of the cycle of the output power signal.

2. An uninterruptible power supply as recited in claim 1, in which a duration of the ON state is varied to regulate the upper limit of the output power signal.

3. An uninterruptible power supply as recited in claim 1, in which the at least one inverter control signal is switched between an ON state and an OFF state during the first and third portions of the cycle of the output power signal.

4. An uninterruptible power supply as recited in claim 3, in which a duty cycle of the inverter control signal during the first and third portions of the cycle of the output power signal is varied to control a slope of the first and third portions of the cycle of the output power signal.

5. An uninterruptible power supply as recited in claim 1, in which:
the quasi square wave of the output power signal further has a lower limit and a third change of phase;
the cycle of the output power signal comprises fourth portion, a fifth portion, and a sixth portion, in which
the fourth portion extends from the second change of phase to the lower limit,
the sixth portion extends from the lower limit to the third change of phase, and
the fifth portion extends between the fourth portion and the sixth portion;
the inverter section generates the standby power signal based on first and second inverter control signals;
the second inverter control signal is
pulse width modulated during the fourth portion of the cycle of the output power signal, and
held in an ON state during the fifth portion of the cycle of the output power signal, and
pulse width modulated during the sixth portion of the cycle of the output power signal.

6. A method of providing an output power signal to a load based on an input power signal comprising the steps of:
connecting an input section to the input power signal;
connecting an output section to the load;
connecting an inverter section to an alternative power source;
connecting a transformer to the input section, the output section, and the inverter section;
operating the uninterruptible power supply in
a line mode in which the output generates the output power signal based on the input power signal, and
a standby mode in which the output section generates the output power signal based on a standby signal generated by the inverter section from the alternative power source and at least one inverter control signal; and
when the uninterruptible power supply operates in the standby mode, generating the at least one inverter control signal such that
the output power signal is a quasi square wave having a first change of phase, an upper limit, and a second change of phase;
a cycle of the output power signal comprises first portion, a second portion, and a third portion, in which
the first portion extends from the first change of phase to the upper limit,
the third portion extends from the upper limit to the second change of phase, and
the second portion extends between the first portion and the third portion; and
the at least one inverter control signal is
pulse-width modulated during the first and third portions of the cycle of the output power signal; and
held in an ON state during the second portion of the cycle of the output power signal.

7. A method as recited in claim 6, further comprising the step of varying a duration of the ON state to regulate the upper limit of the output power signal.

8. A method as recited in claim 6, further comprising the step of switching the at least one inverter control signal between an ON state and an OFF state during the first and third portions of the cycle of the output power signal.

9. A method as recited in claim 8, further comprising the step of varying a duty cycle of the inverter control signal during the first and third portions of the cycle of the output power signal to control a slope of the first and third portions of the cycle of the output power signal.

10. A method as recited in claim 6, in which:
the modified square wave of the output power signal further has a lower limit and a third change of phase;
the cycle of the output power signal comprises fourth portion, a fifth portion, and a sixth portion, in which
the fourth portion extends from the second change of phase to the lower limit,
the sixth portion extends from the lower limit to the third change of phase, and
the fifth portion extends between the fourth portion and the sixth portion;
the inverter section generates the standby power signal based on first and second inverter control signals; and
the second inverter control signal is
pulse width modulated during the fourth portion of the cycle of the output power signal,
held in an ON state during a fourth portion of the cycle of the output power signal, and
held in the ON state during the fifth portion of the cycle of the output power signal.

11. An uninterruptible power supply as recited in claim 5, in which:
the first inverter control signal is held in the OFF state during the changes of phase; and
the second inverter control signal is held in the OFF state during the changes of phase.

12. A method as recited in claim 10, in which:
the first inverter control signal is held in the OFF state during the changes of phase; and
the second inverter control signal is held in the OFF state during the changes of phase.

13. An uninterruptible power supply as recited in claim 1, in which the first inverter control signal is held in the OFF state during the changes of phase.

14. A method as recited in claim 6, in which the first inverter control signal is held in the OFF state during the changes of phase.

\* \* \* \* \*